United States Patent

Wachli

[11] Patent Number: 5,212,391
[45] Date of Patent: May 18, 1993

[54] LASER SENSOR FOR DETECTING THE EXTENDED STATE OF AN OBJECT IN CONTINUOUS MOTION ESPECIALLY THE CLOGGED OR BROKEN STATE OF A DRILL BIT

[75] Inventor: John Wachli, Rancho Palos Verdes, Calif.

[73] Assignee: Excellon Automation, Torrance, Calif.

[21] Appl. No.: 791,416

[22] Filed: Nov. 13, 1991

[51] Int. Cl.$^5$ .............................................. G01N 21/86
[52] U.S. Cl. ..................... 250/561; 356/375
[58] Field of Search ............... 250/560, 561, 223 R, 250/562, 563; 356/375, 376; 324/175; 901/41, 47

[56] References Cited
U.S. PATENT DOCUMENTS

| | | |
|---|---|---|
| 4,340,326 | 7/1982 | Buonauro et al. |
| 4,502,823 | 3/1985 | Wronski et al. ................. 356/375 |
| 4,613,812 | 9/1986 | Gelston, II |
| 4,654,523 | 3/1987 | Tanaka et al. |
| 4,657,395 | 4/1987 | Shiraishi et al. |
| 4,667,113 | 5/1987 | Nakajima et al. |
| 4,678,337 | 7/1987 | Cohen et al. |
| 5,004,930 | 4/1991 | Gremaud et al. ................. 250/561 |
| 5,005,978 | 4/1978 | Skunes et al. |

OTHER PUBLICATIONS

Broken Tool Indicator Service Manual, Rev. C, Excellon Automation, Torrance, California, Jul. 1987, pp. 2-1, 4-1 to 4-3.

Primary Examiner—David C. Nelms
Attorney, Agent, or Firm—Knobbe, Martens, Olson & Bear

[57] ABSTRACT

A non-contact, laser detection system for detecting the extended state of an object in continuous motion such as a drill bit. In the drill bit embodiment, the detected states are clean, clogged and broken In the laser detection system, a first signal, indicative of energy reflected from the surface of the drill bit, is digitized and compared to a first threshold A second signal, indicative of amplified energy reflected from the drill bit, is digitized and compared to a second threshold. The digital signals are analyzed by a computer to detect the state of the drill bit.

27 Claims, 6 Drawing Sheets

LASER SENSOR FOR DETECTING THE EXTENDED STATE OF AN OBJECT IN CONTINUOUS MOTION ESPECIALLY THE CLOGGED OR BROKEN STATE OF A DRILL BIT

BACKGROUND OF THE INVENTION

1. Field of the Invention

The present invention relates to industrial type non-contact detection systems for ascertaining the state of an object in a machine system. More specifically, the present invention relates to a laser detection system for ascertaining the state of rotating objects or objects in some other continuous repetitive motion.

2. Description of the Prior Art

The development of machinery for automated manufacturing has produced many benefits to mankind. More specifically, today, the manufacture of most consumer and industrial electronic instruments and appliances is largely automated. During the manufacture of electronics boards, holes must be precisely drilled in a circuit board for interconnecting circuits on the board and for fastening the boards to a chassis. For this purpose, high speed, computerized drilling machines rapidly position the board, hold it in place, and drill the necessary holes.

However, problems arise when a drill bit breaks during the drilling operation and the broken bit goes undetected. If the broken bit is not detected, the drilling machine will attempt to continue drilling holes with serious consequences On the one hand, if the drill breakage occurs only a small distance from the tip of the bit, the drilling machine will continue to drill with the damaged drill bit, thus destroying the board or, at best, producing unacceptably poor quality holes and, in either case, this may require the defective circuit board to be discarded. On the other hand, if the drill breakage occurs at a greater distance from the drill tip, the resultant circuit board will lack holes which were to be created in the drilling process subsequent to the bit being damaged A defective board lacking one or more holes may be recognized during a post-inspection process and the missing holes may be drilled However, this corrective procedure causes a significant reduction in productivity While non-contact systems for detecting broken bits are presently available, conventional non-contact systems are typically highly affected by environmental conditions and are unable to be conveniently located on the drilling system Presently known non-contact detection systems include those using light emitting diode (LED) or microwave technologies, both of which are highly susceptible to environmental conditions. These non-contact detection systems do not utilize the benefits of the continuous repetitive movement of the object to eliminate error, interference and the effects of harsh changing environmental conditions.

Also, many available detectors are required to be located very close to the object and at an angle normal to the objects motion. Generally, this is a poor location and subjects the detection device to difficult operating conditions. In a drilling machine operation, the traditional light detection systems must be placed in a ballistic path of the debris generated by the drill increasing interferences and device errors.

LED detection systems utilize the principle of light occlusion thus requiring the object being detected to be directly in the path of the light. On drilling systems, this necessitates the full retraction of the drill bit into a pressure foot assembly This full retraction after each hole is drilled greatly decreases the efficiency of the drilling machine. Also, such a system must detect small fractional signal changes, particularly for drills with smaller diameters. However, the resulting LED, or occlusion, system has a relatively low signal-to-noise ratio making such signal ranges difficult to detect.

Non-contact microwave detection systems operate on the principle that the presence of a continuous target, such as a fine drill, in or near the end of the waveguide at a predetermined location produces a change in the standing wave ratio (SWR) of the transmitted signal This change in the SWR is capable of being detected by a receiver to provide a signal that is indicative of the target condition. These microwave systems do not operate using the Doppler principle of measured frequency change; rather, only the DC component of the signal is utilized by such detection systems Hence, the frequency components of the output signal are not used.

The creation of a resonant microwave cavity and the detection of objects entering the cavity by a change in the SWR is affected by nearly any foreign object entering the resonant cavity Thus, such a system is prone to interference from airborne debris. The microwave detection systems are also subject to interference from the copper shavings produced during the drilling of copper layers in printed circuit boards, known as "drill-wrap", and system to system variations.

In addition, all elements in or surrounding the microwave cavity must remain constant The components making up the cavity cannot be moved without making changes or adjustment to the microwave detection device. The microwave detection system is not easily adaptable from system to system and adjustments or variations may be needed depending on the objects in and around the cavity created by each host system.

The microwave detection systems produce small signal changes from the object-present state to the object-not-present state which are analyzed by the system's comparator. Using a small signal change greatly increases the possibility of error by the microwave system In addition to the aforesaid disadvantages of the presently known drill bit detections systems, these systems do not detect when a drill bit is clogged. Because of the environmental affects on LED detection systems, and the resulting low signal-to-noise ratio, it is difficult to obtain a signal that is measurably indicative of the varying reflectivity of a spinning drill bit It will also be appreciated that the present microwave systems utilize only the DC component of the reflected signal and, therefore, do not take into account the frequency of the reflected signal.

Many of the disadvantages of the LED and microwave systems have been overcome by the advent of a laser detection system which detects fluctuating light reflected from a drill bit Such a laser detection system is presently included in the Concept 1 & 4, MVI and MVII drilling machines manufactured by Excellon Automation of Torrance, Calif. Nevertheless, while the present laser detection system is advantageous for detecting the presence or absence of a drill bit, it does not detect whether a drill bit is clogged.

A drill bit may be become clogged, for example, when "green" printed circuit boards are being drilled. Circuit boards are typically formed from an epoxy resin material which must be cured. Therefore, a green, or incompletely cured, board contains tacky material that may stick to the drill bit during drilling. A drill bit may also become clogged when the feed rate of the drill bit is too low. That is, if the axial motion of the bit through the work is too slow, the drill bit will heat up, heating surrounding board material by conduction, and again providing a means for tacky material to be deposited in the flutes of the drill bit. A clogged bit has a reduced reflective surface area that causes the present laser detection system to sometimes indicate that the drill bit is broken. Regardless of how material is deposited in the flutes, it is often important to distinguish between a clogged drill bit and a broken drill bit.

In general, when a drill bit breaks, the drilling of a circuit board must stop until the drill bit is replaced on the other hand, when a drill bit is clogged, the drilling process need not necessarily stop. Oftentimes, the drill bit will clog but it is unnecessary to clean the drill bit until many boards have been drilled. Therefore, if the bit detection system cannot distinguish between whether a bit is broken or just clogged, drilling time is lost due to unnecessary delays in checking clogged bits It is also vital to provide the user of the drilling machine with the option of either stopping the machine or continuing the drilling.

Consequently, a need exists for a drill bit detection system which can accurately detect the state of an unbroken drill bit. Of present significance, the drill bit should be determined to be clean, clogged or broken. In addition, if the drill bit is clogged, the operator of the drilling machine should be given the option to stop or continue drilling.

SUMMARY OF THE INVENTION

The present invention, which satisfies the aforementioned needs, includes a non-contact laser detection system which detects fluctuating light reflected from an object in continuous motion and determines the extended state of the object. The system is particularly useful for detecting the state of a particular tool or portion thereof in an automated machine, thereby providing the capability to detect breakage of or other problems with such a tool during the course of an automated operation. Due to the invention's ability to accurately and repeatedly detect a moving object even in the least conducive environments, it is ideal for industrial applications.

One preferred use of the non-contact laser based detection system is to detect the state of a drill bit on an automated drilling machine Large fluctuating electronic signals are produced by projecting a laser beam near the tip of the drill bit and collecting the light reflected by the concave surfaces of the drill bit flute with a photodetector By obtaining a thresholded signal and an amplified, thresholded signal, the state of a drill bit can be determined as either clean, clogged or broken.

In another aspect of the invention, a signal is detected from energy reflected from an object in continuous, repetitive motion The signal level of the frequency of the signal is detected Also, the signal is amplified, and the signal level of the frequency of the amplified signal is detected. The detected signal and detected amplified signal levels are then processed to determine the extended state of the object which may be one of: object present and clean, object present and unclean, and object absent.

In another aspect of the invention, a drill bit sensor includes a means for sensing light reflected from the flutes of a rotating drill bit. One signal means detects the presence or absence of a drill bit. Another signal means detects whether the flutes of the drill bit are clogged. The signal means may be connected to one another.

Yet another aspect of the invention is a method of rotating bit detection wherein reflected light received from the bit is processed so as determine whether the bit is clogged or broken. The invention may also include a method of detecting the state of an object in rotational motion wherein the object is tracked by a first signal which is thresholded, a second signal is obtained from the first signal and the second signal is thresholded, and a comparison is made of the thresholded signals to detect the presence of a material on the object Lastly, in a drilling machine having a non-contact laser detection system, the invention includes electronics for detecting when a drill bit is clogged.

DESCRIPTION OF THE PREFERRED EMBODIMENT

Reference is now made to the drawings wherein like numerals refer to like parts throughout. In general, FIGS. 1-6 refer to a prior art laser detection system which will hereinafter be described so as to facilitate an understanding of the present invention.

Figure 1:
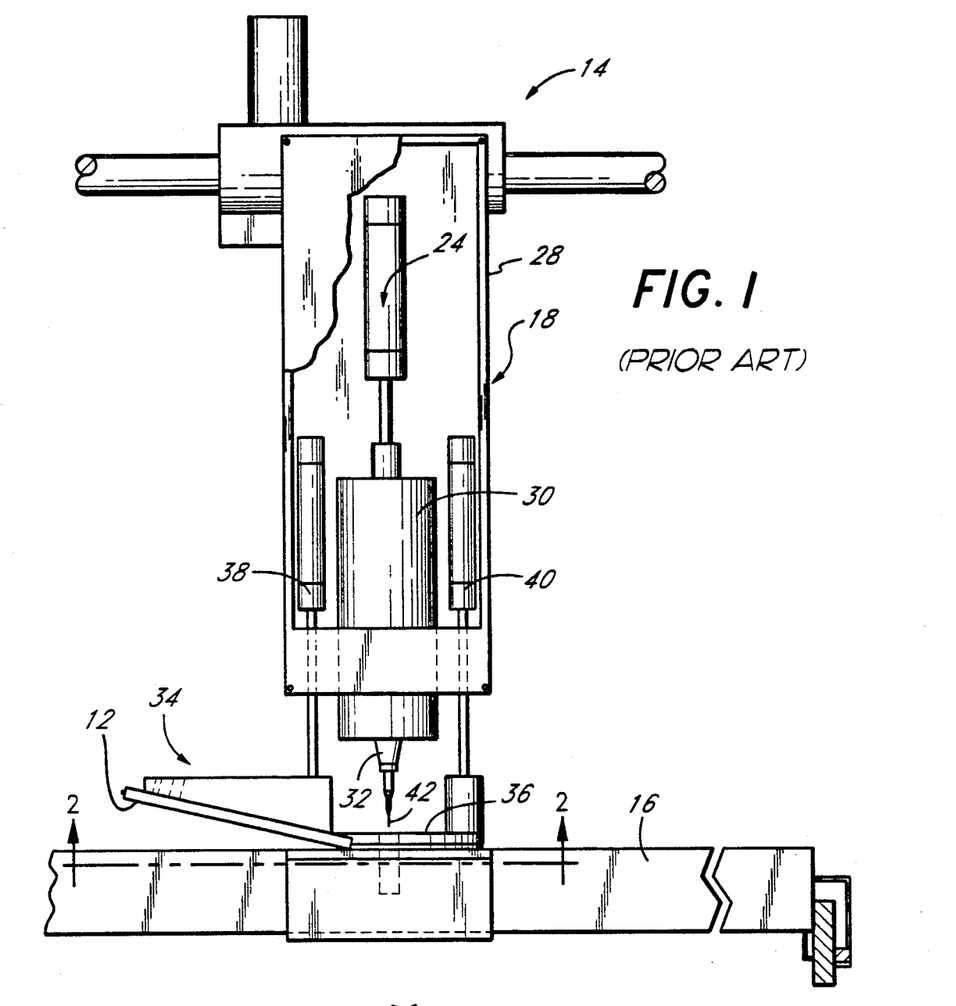
FIG. 1 is a fragmentary, front elevational view of an automated circuit board drilling machine having a laser detection system mounted thereon.
Figure 7:
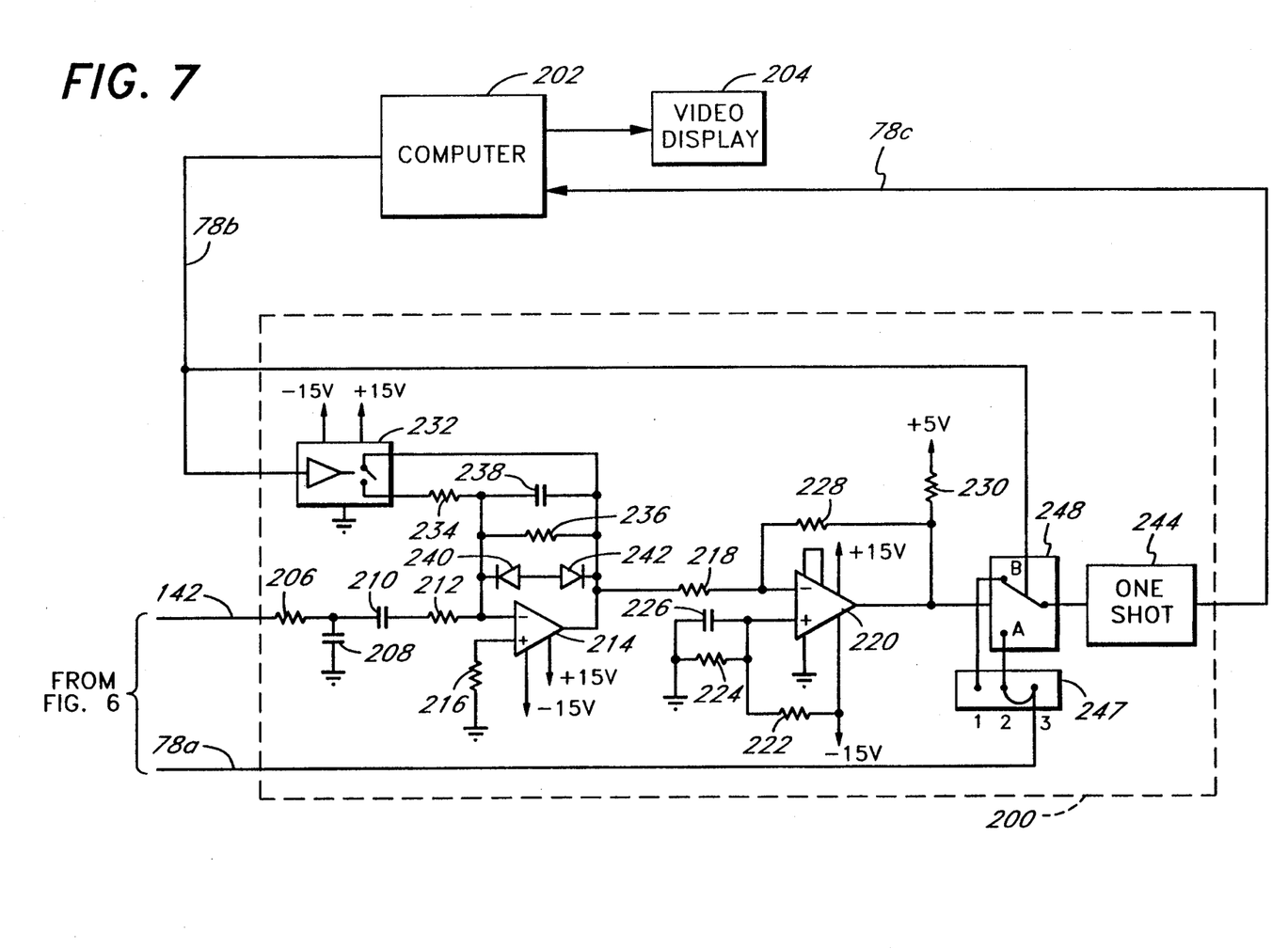
FIG. 7 is a schematic of the sensor electronics for amplified signal detection.

FIG. 1 shows a drilling machine, generally indicated at 14, for drilling holes in circuit boards The automated drilling of holes in circuit boards is typically accomplished by mounting a circuit board 44 (FIG. 1a) to a servo motor driven worktable 16 of an automated circuit board drilling machine 14 which is controlled by a computer 202 (FIG. 7). Examples of such machines are the CONCEPT IV drilling and routing systems manufactured by Excellon Automation of Torrance, Calif.

The circuit board 44 is accurately positioned on a worktable 16 below a spindle assembly 18 which rotates a drill bit 42 at speeds varying from approximately 15,000 to 100,000 rpm. To eliminate any problems caused by warpage of the circuit board 44 during the drilling process, a pressure foot 34 applies a force of about sixty pounds on the circuit board 44 to ensure that good contact is maintained between the circuit board 44 and the worktable 16. The pressure foot 34 also contains a vacuum system (not shown) to remove dust and debris generated by the action of the drill 42. The spindle assembly 18 and the pressure foot 34 are lowered and the rotating drill bit 42 forms a hole 52 in the circuit board 44. The entire drilling process is usually coordinated by the computer 202 (FIG. 7) and runs at speeds of about five holes per second.

The computer 202 controls such things as positioning of the worktable 16 feed rates of the board 44, rotational speed of the drill bit 42 (e.g. rpm), automatic changes of the drill bit 42, and diameter verification of the drill bit 42. The need for small pads, thin conductor lines, and narrow line spacings in printed circuit boards requires automated circuit board drilling machines to have the ability to drill numerous small to large high quality holes of varying diameters ranging from 0.004 to 0.250 inches. Following the lowering of the drill bit 42 to create a circuit board hole 52 (FIG. 1a), the drill bit 42 and pressure foot 34 are retracted and the circuit board 44 is automatically repositioned so that the next hole may be drilled.

Because the automated drilling machine 14 rapidly drills the necessary holes, at a rate of five per second, it is not possible for a person to visually inspect the tip of the drill bit 42 to see if it has been broken or damaged and attempt to stop the machine 14. Therefore, automated or non-contact methods were initially developed, using microwave and light occlusion techniques, to automatically check and react to broken and damaged drill bits.

Non-contacting light detection systems traditionally operate on the premise of projected light being occluded by the object desired to be detected and not by light reflection from the object For a light occlusion system, the smaller the laser beam is with respect to the drill, the larger the fractional change in detected signal becomes. The problem with the light occlusion system (or LED system) is that the focused beam diameter is much larger than the smallest diameter drill. For the smaller diameters a very small fractional change in detected light must be sensed accurately. In a light occlusion system, any foreign objects in the path of the light will also block of occlude the beam and possibly give a false reading that the object is present. Occlusion systems are also based on a steady light signal. Steady state light detectors have been plagued by problems from dust, debris and other environment conditions. A system which detects fluctuating light, such as the reflected light system described in connection with the present invention eliminates nearly all interference from dust, debris and ambient light.

Figure 3:
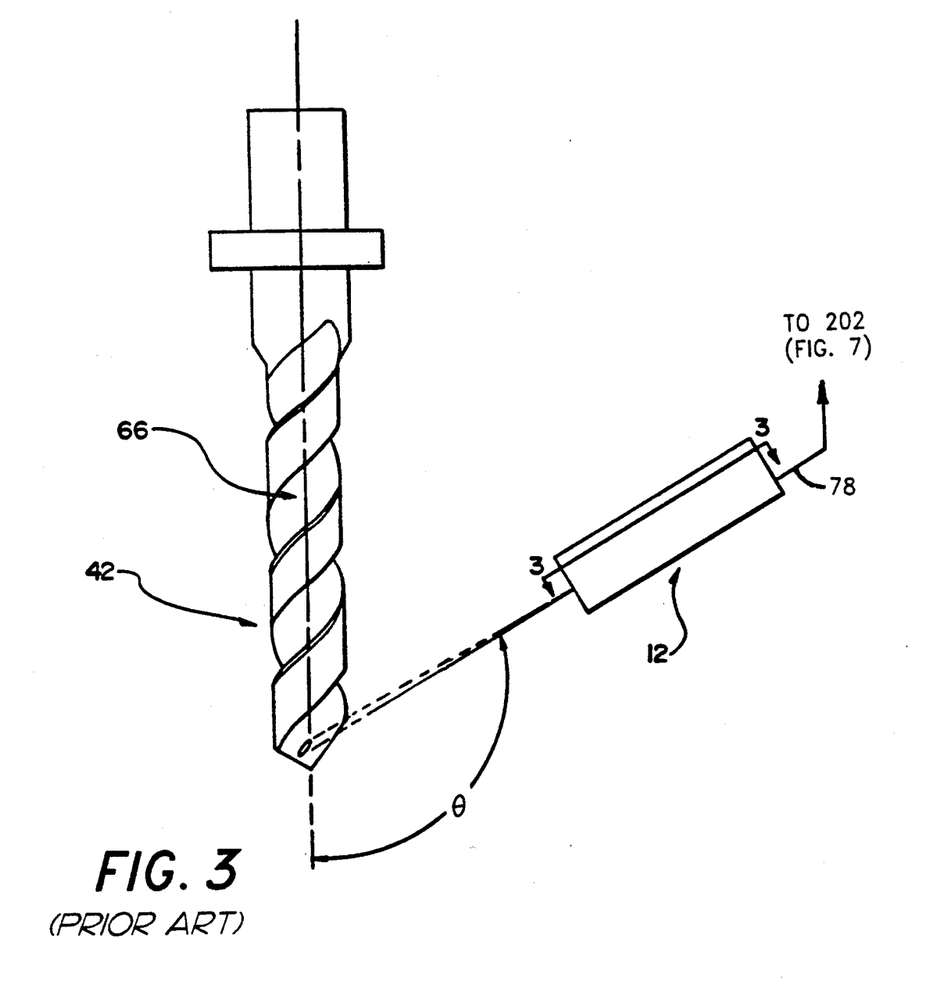
FIG. 3 is a schematic diagram depicting a drill bit and the laser detection system.

As shown in FIGS. 1 and 3 and other drawings, the present invention uses a laser detection sensor 12 to monitor the state of the drill bit 42. Of course, other rotating objects, such as router bits, may also benefit from the present invention. The use of a laser instead of a traditional incoherent light source greatly increases the sensitivity and accuracy of the detection system. Traditional light detection systems have smaller fractional signal changes from the object-present state to the object-not-present state than the present invention. Utilizing an LED light source detector on drill bit 42 diameters ranging from 0.004 to 0.250 inches, the light will be only partially occluded by the finer drill bits 42. Therefore, use of this method requires differentiation between small fractional signal changes from the object-present state to the object-not-present state. A laser 60 is able to produce a more intense concentration of energy in the region of the drill tip than either standard LED or a microwave device. Use of a laser beam focused on a particular point of the moving object such as the tip of the drill bit 42, which reflects a signal back to the detector if the drill bit tip is present, but does not if the drill bit is gone, greatly assists in producing a large ratio of signal change from the object-present to the object-not-present state.

Referring more specifically to the embodiment of a laser detection system shown in FIG. 1, a sensor, or laser detection system 1 for the non-contact laser detection of a drill bit 42 is depicted in conjunction with an automated circuit board drilling machine 14. The drilling machine 14 includes the worktable 16 which can accommodate a plurality of circuit boards 44 (FIG. 1a) to be drilled, a drill or spindle assembly 18, and a drill vertical positioning motor and lead screw assembly 24. A control module (not shown) includes the electronic circuity for precise three dimensional position of the drill bit 42 in relation to the worktable 16, and error control circuitry (not shown) halts the drilling process when an error is detected by the sensor. The drill assembly 18 includes a drill case 28, a spindle 30, a collet 32, the drill bit 42, and the pressure foot 34. The pressure foot 34 includes the pressure plate 36 and two pressure bearing piston and cylinder assemblies 38, 40. The detachable drill bit 42 is carried by the drill collet 32. The drill vertical positioning piston and cylinder assembly 24 retracts the drill bit 42 after a hole has been drilled.

The drilling sequence starts by loading a drill bit of a selected diameter in the drill collet 32. The drilling machine 14 then proceeds to drill a number of holes in the circuit board 44 (FIG. 1a) at various locations on the board. Upon completion of this operation, another drill bit of possibly different diameter is loaded in the collet 32 and the process is repeated until all holes are drilled in the circuit board 44. Problems arise when the drill bit 42 either breaks or is missing during the drilling operation.

Figure 1A:
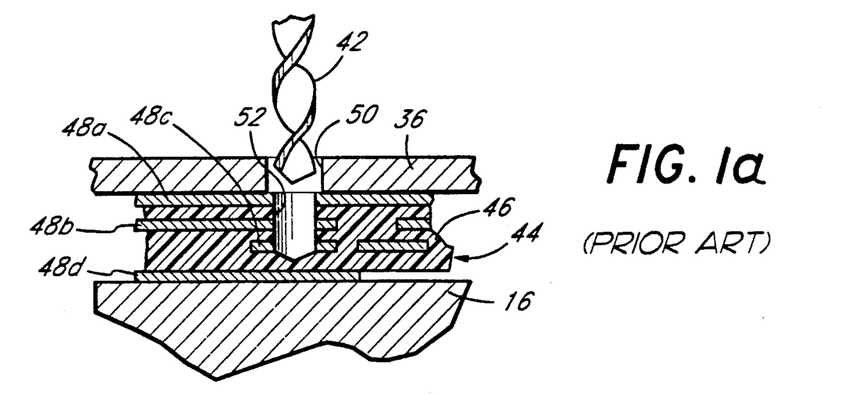
FIG. 1a is an enlarged, fragmentary view of a printed circuit board mounted on an automated circuit board drilling machine with a hole drilled into the board.

Referring to FIG. 1a, the printed circuit board 44 is shown positioned between the upper surface of the worktable 16 and the pressure plate 36. The printed circuit board 44 includes an electrically nonconducting substrate 46 and a plurality of conducting lines 48 positioned within the substrate 46 in a plurality of conducting layers 48a, 48b, 48c, 48d. The drill bit 42 is depicted in FIG. 1 as being withdrawn from a drill bit passage aperture 50 of pressure plate 36 after drilling a hole at 52 to connect conducting layers 48a, 48b, 48c.

Figure 2:
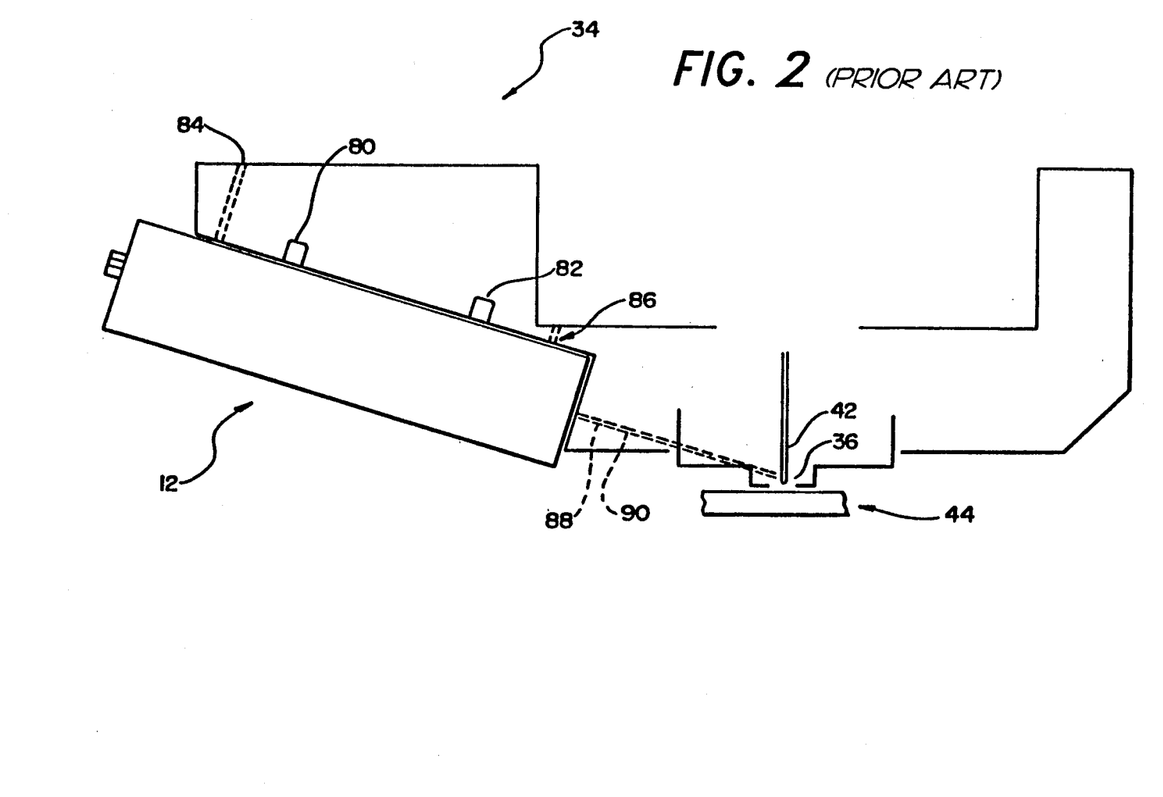
FIG. 2 is a cutaway side view of the pressure foot assembly taken along the line 2—2 in FIG. 1.

FIG. 2 shows the pressure foot assembly 34 in more detail including the laser detection system 12. The laser detection system 12 is positioned such that a projected laser beam is in direct line of sight with the tip of the drill bit 42 after the drill bit 42 has completed drilling and has been minimally retracted into the pressure foot assembly 34. By mounting the sensor 12 inside the pressure foot 34 and projecting the laser beam near the tip of the drill bit 42, the presence of the drill tip may be verified after each drilling stroke.

As shown generally in FIGS. 2 and 3, the preferred detection system minimizes the distance required for the drill bit 42 to be retracted by projecting the laser beam down the axis of rotation forming an angle that is approximately 25 degrees above a normal to the axis, thus being positioned at an oblique angle to the axis of the drill 18. It is preferred that the angle be over 90 degree from the axis to about 120 degrees. Hence, increased drilling machine throughput is obtained by projecting the laser beam and sensing the reflected light at an angle oblique to the drill axis of revolution. When the drill assembly 18 retracts as shown in FIG. 1a, debris and copper shavings produced during drilling enter the cavity formed in the pressure foot 34. Projection at normal incidence, as was done with some past designs, complicates vacuum design since the optics would then be located in a direct ballistic path of the debris generated by the drill bit 42.

Now referring specifically to FIG. 2, a pair of positioning dowels 80 and 82 located inside the pressure foot 34 provide alignment for the sensor. Support screws 84 and 86 which hold the detection device 12 in place are located at the top of the pressure foot assembly 34. Light pathways 88 and 90 are machined through pressure foot 34 to provide direct lines of sight to the drill bit 42 for a light source 60 and a photodetector 70.

The laser diode, lenses, filters, and sensor head electronics are housed in a mechanical mount which serves as the sensor body 12. The sensor body may be an integral part of the drilling machine pressure foot 34 or a modular unit mounted in the pressure foot 34.

Figure 3A:
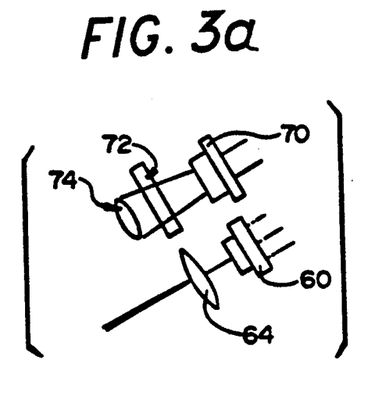
FIG. 3a is a top schematic view of the optical components of the laser detection system taken along the line 3—3 in FIG. 3.

FIG. 3 is a schematic representation showing the drill 42 and the sensor 12 in more detail. FIG. 3a illustrates the optical components of the sensor 12. As shown in FIGS. 3 and 3a, focusing optics take the output of a laser diode 60 and project light onto the drill bit 42. The light from the laser diode 60 is projected through stripe projecting optics 64 and onto the drill bit 42.

Utilizing a focused laser also allows the light source to be located further from the object giving greater immunity to environmental conditions and greater flexibility in machine design. The focused laser light reflects off the concave flute surfaces 66 of the drill bit 42. The utilization of the concave surface of the drill bit flutes 66 also assists in enabling the sensor 12 to be more conveniently located or moved. The ability to locate the sensor 12 away from the object in motion and away from a ballistic debris path makes the sensor 12 less susceptible to environmental interferences. The reflected light is then collected and collimated by a receiving lens 74, filtered by an optical filter 72, and collected by a solid state photodetector 70. The optical filter 72 blocks ambient visible illumination from reaching the photodetector 70 while allowing the near-infrared light from the laser diode 60 to be collected by the photodetector 70. A cable 78 to the computer 202 (FIG. 7) is also connected to the sensor 12 allowing various electrical signals to be sent and received by the sensor 12. One of the signals which travels on the cable 78 is the beam detect signal. The beam detect signal is generated each time a drill bit flute 66 is detected. The drill bit 42 is considered broken or absent when the beam detect signal does not change states for a period of time which comprises at least one complete drill revolution.

In order to accommodate a wide range of drill bit diameters, the sensor optics may project a stripe of light onto the drill bit 42. This will ensure that there will be at least one point per flute 66 on the drill bit 42 which will reflect light back to the photodetector 70. Optical alignment is also less critical when using a stripe of light. To generate a stripe of light, the focusing optics 64 may incorporate cylindrical or toric elements. Stripe projection dimensions of approximately 0.004 inches in height and 0.020 inches in width appear preferable. For a fixed output of the laser diode 60 the larger the stripe the lower the optical power density at the point of best reflection on the drill bit 42. The optical power density at a point in the stripe will be lower than it would be for a spot of light. This results in less received optical signal at the detector 70.

When light is projected at an angle normal to the drill axis, the laser beam is preferably focused at or about the drill axis. When the light is projected at an oblique angle with respect to the drill axis of revolution, which is a preferred embodiment, the photodetector 70 receives the largest signal when the light is reflected from a point on the concave drill bit flute surface 66 which is slightly off the drill axis. The best reflection point is a function of the laser beam projection angle, the drill bit helix angle, and the diameter of the drill bit 42. For a fixed drill bit helix angle and a fixed laser beam projection angle, the best reflection point is further away from the drill bit axis for large diameter drill bits than it is for smaller diameter drill bits.

A large fluctuating signal is thus produced as the drill bit 42 rotates. The laser beam is reflected from each of the two flute surfaces 66 of the rotating drill 42 to the detector 70, giving an oscillating, or AC, signal whose frequency is directly related to the frequency of rotation of the drill bit. Thus, the presence of the oscillating signal of laser light, at the predetermined frequency, can be sensed. Other frequencies, including DC or ambient light, can be optically and electronically filtered as described below. The absence of such an AC signal, of course, means the top of the drill bit 42 has been broken or damaged.

Figure 4:
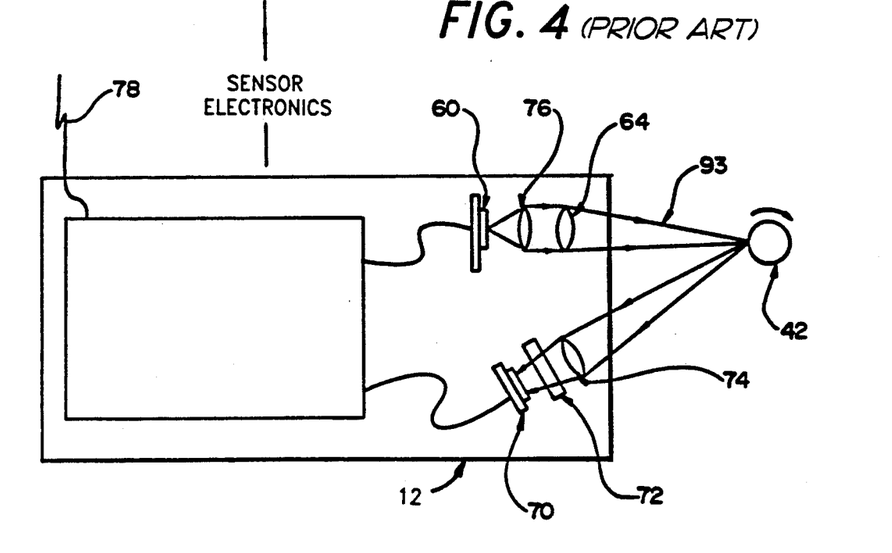
FIG. 4 is a top schematic view of the laser detection system including the sensor electronics.

The optical components and sensor head electronics are housed in a mechanical mount which serves as the sensor body 12 as shown in FIG. 4. FIG. 4 schematically shows the details of the sensor body 12 and its relation to the drill bit 42. The sensor body 12 houses the optics including the laser diode 60, source lens 76, stripe projecting optics 64, photodetector 70, optical filter 72, and receiver lens 74. The sensor body 12 also houses the electronics of FIGS. 5, 6 and 7, which will be described hereinbelow. The cable 78 is connected to the sensor 12 allowing various electrical signals to be sent and received from the computer 202 (FIG. 7).

As is shown in FIG. 4, the lenses are not projecting and receiving in parallel paths to each other but form an angle. This angle can range from 0 to 90 degrees when the lenses are in the same horizontal plane. The source lens 76 and stripe projecting optics 64 shown in FIG. 4 may be combined into a single toric shaped optical element.

Figure 5:
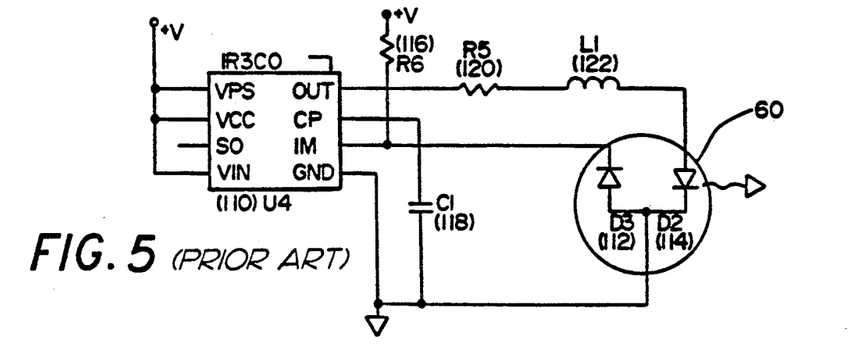
FIG. 5 is a schematic of the sensor electronics controlling the output of the laser diode.
Figure 6:
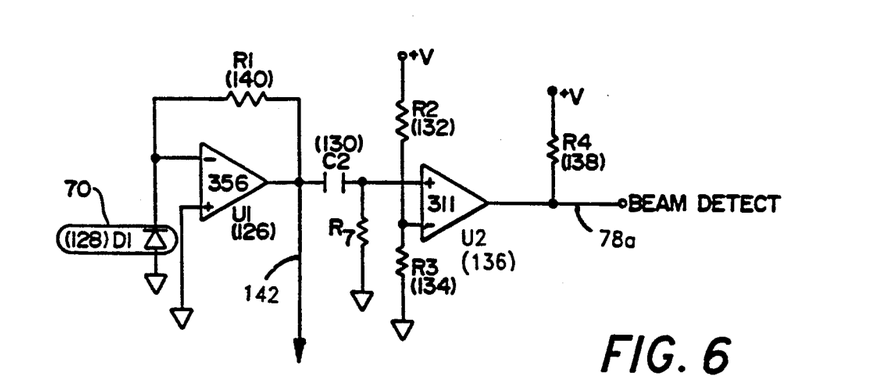
FIG. 6 is a schematic of the sensor electronics which amplify the output of the photodetector and produce a beam detect signal when the presence of a drill bit is sensed.

The sensor electronics shown in FIGS. 5 and 6 control the laser power, amplify the output of the photodetector 70, and produce the beam detect signal when the presence of a drill bit 42 is sensed.

The integrated circuit 110 in FIG. 5 controls the output power of the laser diode 60. The output of a photodiode 112, which is packaged with a laser diode 114, is used as feedback to the integrated circuit 110 to maintain constant optical power. A programming resistor 116 adjusts the output power of the laser diode 114.

FIG. 6 shows the electronics which convert the light falling on the photodetector 70 to a signal that the drill bit 42 was sensed. A transimpedance amplifier 126 is used to generate a voltage proportional to the amount of light falling on a photodetector diode 128. A blocking capacitor 130 allows only fluctuating voltage signals to be applied to the input of a comparator 136. When the level of this fluctuating voltage exceeds the threshold voltage level established by the voltage divider network of a pair of resistors 132 and 134, the output of the comparator 136, indicates that a drill bit was sensed. The output of the comparator 136 is sent to the computer 202 (FIG. 7) along a line 78 so that if the output of the comparator 136 indicates that the drill bit 42 has not been detected, corrective action may be taken.

In a more elaborate implementation, the signal can be sampled and the samples processed in a detector that is coherent to the frequency of rotation. If the drill bit 42 has a frequency of rotation that is known, for example from an electrical feedback mechanism (such as a tachometer) attached to the spindle assembly 18, an adjustable electronic filter can be implemented such that the detector looks for signals only around a narrow band of frequencies centered at the drill bit's 42 frequency of rotation. This has the effect of reducing the electrical noise bandwidth and hence increasing the electrical signal-to-noise ratio.

Since the laser source 60 can concentrate a large amount of energy on a small area of the drill tip, large fractional signal changes occur at the detector 70 when a drill tip breaks. Also, because the output of the detector 70 is electronically filtered such that only fluctuating (AC) signals are considered, the sensor 12 becomes immune to changes in the background light level.

Note that, in the present invention, an analog beam signal is provided from the beam detection circuit of FIG. 6 by the amplifier 126, and the signal is fed to a line 142 where it is processed by the circuit of FIG. 7.

FIG. 7 is a schematic of a flute detection circuit 200 of the present invention. The detection circuit 200 is provided with a switch select signal from the computer 202 via a line 78b and an analog beam signal from the beam detect circuit of FIG. 6 via the line 142. The detection circuit 200 generates a flute state signal to the computer 202 across a line 78c. The computer 202 processes the beam detect signal (fed across the line 78a) and the flute detect signal to arrive at an extended state of the drill bit 42 (FIG. 1) which is displayed on a video display 204.

As discussed hereinabove, the prior art laser detection system determines the state of an object in continuous motion as to one of the following: presence or absence. In a drilling machine embodiment, these states correspond to drill bit normal and drill bit broken. However, if a drill bit becomes clogged with foreign material, the prior art system may provide a false detected state that the drill bit is broken.

The false detection of a broken bit is principally due to the fact that when the flutes of the bit are clogged with circuit board material, such as epoxy resin, the reflective characteristic of the drill bit flutes is lowered to the point that the beam detection circuitry does not generate a significant signal change to identify the flutes. That is, the voltage of the detected signal does not exceed the predetermined threshold value. In many instances, the misidentification of a broken drill bit leads to a loss of drilling machine utilization while the machine is halted to check and clean the drill bit. Therefore, it is a major objective of the present invention, in a drilling machine embodiment, to provide an extended drill bit state selected from the following set: (1) drill bit normal, (2) drill bit broken and (3) drill bit clogged.

Now referring back to FIG. 7, the analog beam signal received by the circuit 200 via the line 142 is amplified, in the presently preferred embodiment, by an analog buffer amplifier (not shown) to compensate for the attenuation of the signal between the circuits of FIGS. 6 and 7 which are preferably located on different printed circuit boards. The beam signal is low pass filtered across a resistor-capacitor or RC filter 206, 208, i.e., the high frequency components of the signal are removed. The beam signal is then fed to an AC coupling capacitor 210. The AC coupling capacitor 210 blocks the DC component of the signal and passes the AC components.

The beam signal is then fed from the capacitor 210 to the inverting ($-$) input of an operational amplifier 214 through a resistor 212. A resistor 236 is the feedback element of the amplifier circuit. The ratio of the two resistors 212, 236 will determine the gain of the amplifier 214. A resistor 216, connected between ground and the non-inverting ($+$) input of the amplifer 214, minimizes bias and offset current effect. The amplifier 214 is preferably chosen so as to amplify the low frequency components of the beam signal by a factor of at least 100. The amplified beam signal is then fed through a resistor 218 to the positive input of a comparator 220, which is a part of a thresholding circuit.

The thresholding circuit includes the comparator 220, which provides a digital signal output. The comparator 220 is fed a negative threshold voltage by the voltage divider network comprising a resistor 222 (directly connected to negative power), and a resistor 224 (directly connected to ground). A capacitor 226 is connected in parallel with the resistor 224 to provide low pass filtering of the threshold signal. The thresholding circuit also includes a second resistor 228 which is located across the positive voltage input and the output of the comparator 220. The resistors 228, 218 serve to mitigate a characteristic hysteresis in the comparator 220 when the amplified beam signal has a voltage that is close to the threshold value. A threshold voltage of $-0.67$ V is presently preferred, although one skilled in the technology will understand that the threshold will vary according to the parameters of the particular circuit 220 embodying the invention. The thresholding circuit also includes a pull-up resistor 230 that is coupled between a positive power input and the output of the comparator 220.

During normal operation the digital beam signal provided on the line 78a is connected via a jumper 247 from pin 3 to pin 2, which is connected to input A of a multiplexer 248. Input B of the multiplexer 248 is connected to the output of the comparator 220 carrying the flute detect signal. The computer 202 will connect via line 78b first the beam detect signal and then the flute detect signal to the input of a one shot 244 and monitor the output of the one shot 244 across a line 78c at the appropriate time.

Instead of using the fixed thresholded beam detect signal via the line 78a, jumpering 247 pins 2 to 1 will allow the circuit to generate an adjustable threshold for an equivalent beam detect signal. If the computer 202 selects output A of the multiplexer 248, an analog switch 232 closes, connecting a feedback resistor 234 in parallel with the high gain feedback resistor 236. The gain of this amplifier 214 is now determined by the ratio of the parallel resistance of the resistor 234 and the resistor 236, and the input resistor 212. Adjusting the gain of the amplifier 214 would be equivalent to changing the threshold of the comparator 220. A capacitor 238 functions as a low pass filter. A pair of zener diodes 240, 242 provide a voltage clamp to limit the voltage of the circuit 200. This method of operation may be desirable to detect clogged drills of larger size, for example a 0.030 inch bit, which tend to produce an analog beam detect signal 142 of larger amplitude even for clogged drills.

This implementation uses two thresholds to differentiate between clean, clogged, and broken drills. It should be apparent that there are many ways the difference between signals 250 (FIG. 8) and 250' (FIG. 9) can be detected. For instance, one such way would be to detect the peak of signal 250 and 250', feed it through an analog to digital converter to the computer 202 and to let a software algorithm analyze the condition of the drill.

Now, returning in the discussion to the comparator 220, the resulting output is a digital or pulsed signal having high and low voltage levels. This digital signal is indicative of a second order "signature" of the drill bit 42 that generates periodic pulses at frequencies determined according to whether the drill bit flutes are clean or clogged. The pulses can be detected by a one shot integrated circuit 244 which is presently preferred to be a 74LS123 device available from Texas Instruments, for example. If the pulse frequency is greater than or equal to a preselected value, for instance, once every 6 milliseconds, then a continuous high voltage is generated by the one shot 244, indicating that the drill bit is not broken. Otherwise, if the pulse frequency is less than the preselected frequency, a continuous low voltage is generated by the one shot 244. This flute detect signal, provided by the one shot 244, is fed from the circuit 200 across the line 78c to the computer 202 for data processing.

The computer 202 receives the digital signals corresponding to beam detect and flute detect across the lines 78a and 78c, respectively. Note that the beam detect signal is produced by the prior art circuit of FIG. 6, and the flute detect signal is produced by the flute detection circuit 200 of the present invention. It is only through the combining of both of these signals that a clogged bit state can be determined.

The following logic table summarizes the signal combinations processed by the computer 202 in obtaining the extended state of the drill bit 42:

| Beam Detect Signal | Flute Detect Signal | Extended Bit State |
| --- | --- | --- |
| 1 | 1 | Drill bit clean |
| 0 | 1 | Drill bit clogged |
| 0 | 0 | Drill bit broken |

Note that the combination of a logical high, or "1", value for the beam detect signal and a logical low, or "0", value for the flute detect signal is undefined and, if it is detected by the computer, will result in an error condition. This bit state detection could of course be handled by a simple circuit constructed from logic gates. However, the state detection is preferably accomplished in the computer 202 which is a part of the prior art drilling machine 14 (FIG. 1). For instance, the CNC-6 model, having a Zilog Z8000 microprocessor, or the CNC-7, having a Motorola M680x0 microprocessor, are presently available with the drilling machines manufactured by the assignee of the present invention, Excellon Automation.

The computer 202 preferably sends a warning message to the video display 204 when the drill bit is clogged. In this way, the drilling machine operator (not shown) can take appropriate action if the bit is clogged. Such an operator dependent decision allows the drilling to continue, under certain circumstances, and thus prevent "nuisance stops" of the drilling machine. For example, if green circuit boards are being drilled, the operator may choose to let a certain number of boards be drilled with the clogged bit before the machine is stopped to clean the bit. On the other hand, if the drill bit is broken, the drilling machine is almost always stopped immediately, whether automatically by an initialization parameter or by operator intervention.

Figure 8:
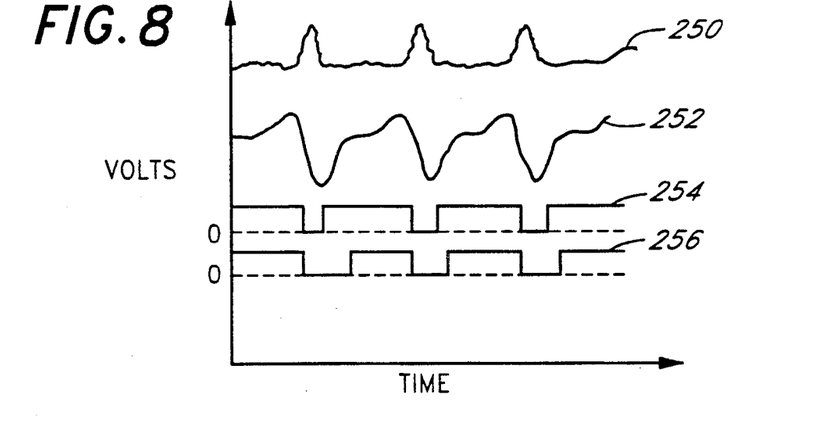
FIG. 8 is a waveform diagram of four signals generated by the sensor electronics of FIGS. 6 and 7 when the drill bit is not broken and the flutes are clean.
Figure 9:
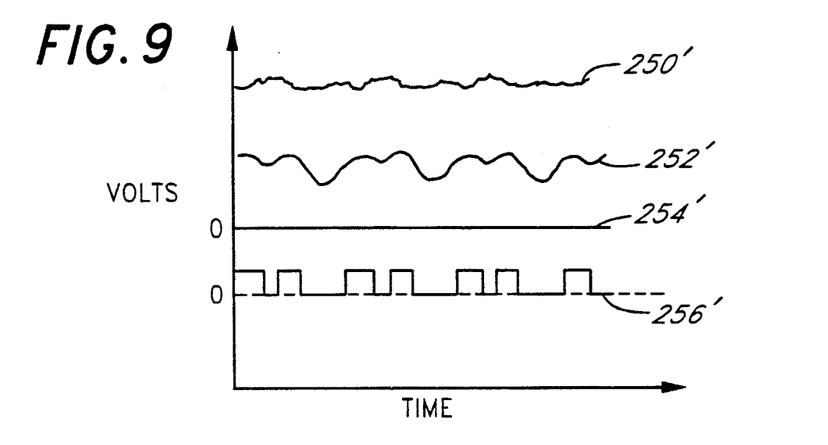
FIG. 9 is a waveform diagram of four signals generated by the sensor electronics of FIGS. 6 and 7 when the drill bit is not broken and the flutes are clogged.
Figure 10:
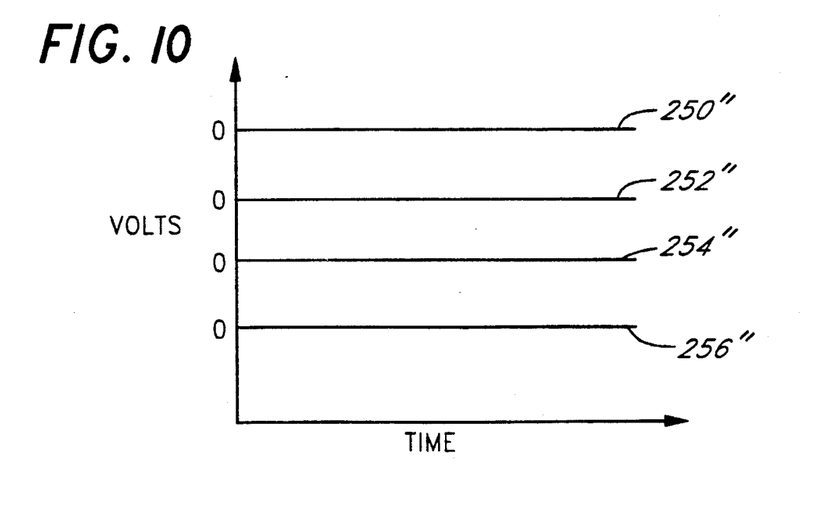
FIG. 10 is a waveform diagram of four signals generated by the sensor electronics of FIGS. 6 and 7 when the drill bit is broken.

Referring generally to FIGS. 8, 9 and 10, the function of the present invention is more fully understood by reference to example waveform diagrams showing certain signals of the laser detection circuit of FIGS. 6 and 7 during a test. The illustrated examples show an analog beam signal waveform 250, an AC amplifier signal waveform 252, a beam detect signal waveform 254 and a flute detect signal waveform 256. With reference back to FIG. 7, the relevant signals are obtained as follows: the analog beam signal is provided on the line 142; the AC amplifier signal is provided at the output pin of the amplifier 214; the beam detect signal is provided on the line 78a; and the flute detect signal is provided on the line 78c. The waveforms were captured at the following oscilloscope resolutions: waveform 250—200 millivolts/division, waveform 252—5 256—5 volts/division. A drill bit having a 0.006 inch diameter was used during the test.

With specific reference to FIG. 8, the waveforms shown are representative of a "drill bit clean" state. It will be observed that the analog beam waveform 250 is indicative of a periodic reflected light signal, and the periodicity of the signal is related to the spinning drill bit wherein each flute of the bit causes a voltage spike. The waveform 250 is smoothed, filtered and amplified by the circuit 200, resulting in the waveform 252 which is now ready for digitization. The digital beam detect waveform 254 exhibits a pulsed signal having low voltage levels when the threshold of the beam detect circuit (FIG. 6) is not exceeded, indicating a non-flute surface of the drill bit 42. The digital flute detect waveform 256 exhibits a pulsed signal having a relatively higher threshold than the beam detect signal, but which causes pulses of the same frequency as the waveform 254.

Turning to FIG. 9, the illustrated waveforms are representative of a "drill bit clogged" state. In this state, the analog beam waveform 250', although periodic, does not exhibit the voltage spikes that are characteristic of a clean drill bit. As a result, the digital beam detect waveform 254' is a continuous low voltage which, without the benefits of the present invention, would falsely indicate that the drill bit is broken, thereby causing the drilling machine to be halted. However, the amplified signature, i.e., the AC amplifier signal, indicated in FIG. 9 by the waveform 252', exhibits second order effects of the drill bit flutes. The amplified signal provides a periodic waveform having great enough amplitude variation that it may now be thresholded for later analysis. This thresholded signal is illustrated in FIG. 9 by the flute detect waveform 256'. Note that, in this example, the one shot 244 (FIG. 7) would provide a continuous high voltage signal to the computer 202. Thus, in the example of FIG. 9, the drill bit is determined to be present, but unclean or fouled, by the computer 202.

Lastly, in FIG. 10, the illustrated waveforms are representative of a "drill bit broken" state. In this state, all of the waveforms 250", 252", 254", 256" indicate continuous low voltage signals, which correspond to the absence of a drill bit.

Having described a preferred embodiment of the invention, it will be apparent to those skilled in the art that it will have many applications. For example, it can be used in a similar manner to detect the state of any machine member which oscillates upwardly and downwardly in a single plane by sensing and detecting a reflected light beam which reflects off the surface of the member in a frequency related to the frequency of oscillations. Also, when detecting movement of non-reflective surfaces, a reflective tape can be used and the laser beam focused to detect reflections from the reflective tape. It will also be observed that the particular function of the embodiment may be changed by, for example, converting the detection to the frequency domain, so long as the second order effects of the amplified signal are detected. All such modifications and variations are intended to be within the scope of the appended claims.

We claim:

1. A sensor for detecting the state of an object in continuous repetitive motion, comprising:
   an energy source for generating energy;
   means for focusing the energy on the object;
   means for detecting energy reflected from the object as a signal;
   means for detecting a level of the signal;
   means for amplifying the signal;
   means for detecting a level of the amplified signal; and
   means for processing the detected signal level and the detected amplified signal level so as to provide a state of the object, wherein the state is at least one of: object present and clean, object present and unclean, and object absent.

2. The sensor defined in claim 1, wherein the energy source includes a laser.

3. The sensor defined in claim 1, wherein the object is a drill bit.

4. The sensor defined in claim 1, wherein the means for detecting energy includes a photodiode.

5. The sensor defined in claim 1, wherein the means for detecting a signal level includes a comparator.

6. The sensor defined in claim 1, wherein the means for detecting an amplified signal level includes a comparator.

7. The sensor defined in claim 6, wherein the comparator receives a predetermined threshold signal.

8. The sensor defined in claim 1, wherein the means for detecting an amplified signal level includes means for detecting a predetermined frequency.

9. The sensor defined in claim 1, wherein the means for processing includes a computer.

10. The sensor defined in claim 1, wherein the means for processing includes a means for displaying the state of the object.

11. A sensor for detecting characteristics of a rotating drill bit having flutes, comprising:
    a laser light source for generating laser light;
    means for focusing the laser light on the rotating drill bill;
    means for sensing light reflected from the flutes of the rotating drill bit;
    signal means connected to the sensing means for indicating the presence of a drill bit; and
    signal means connected to the sensing means for indicating clogged flutes in the drill bit.

12. The sensor defined in claim 11, wherein the sensing means includes a photodiode coupled to an amplifier.

13. The sensor defined in claim 11, wherein the means for indicating presence includes a voltage comparator.

14. The sensor defined in claim 11, wherein the means for indicating clogged flutes includes a selectable clamping circuit.

15. The sensor defined in claim 11, wherein the means for indicating clogged flutes includes a filter.

16. The sensor defined in claim 11, additionally comprising means for displaying the status of the drill bit.

17. The sensor defined in claim 11, wherein the means for indicating clogged flutes is receivably connected to the means for indicating presence.

18. A method of rotting bit detection, comprising the steps of:
    transmitting light towards a bit;
    receiving reflected light from the bit as a signal; and
    processing the signal so as to define a state of the bit wherein the state is one of at least the following set of states: (1) bit clogged and (2) bit broken.

19. The detection method defined in claim 18, wherein the step of processing the signal includes the steps of:
    comparing the signal to a first value;
    amplifying the signal; and
    comparing the amplified signal to a second value.

20. The detection method defined in claim 18, additionally comprising the step of displaying the bit state.

21. The detection method defined in claim 18, wherein the set of states includes a bit clean state.

22. The detection method defined in claim 18, wherein the bit is a router bit.

23. A method of detecting the state of an object in rotational motion, comprising the steps of:
    tracking the object by a first signal related to the frequency of rotation;
    thresholding the first signal with a first selected threshold value;
    obtaining a second signal from the first signal;
    thresholding the second signal with a second selected threshold value; and
    comparing the first and second thresholded signals, thereby detecting the presence of a material on the object.

24. The method of detecting defined in claim 23, wherein the step of obtaining a second signal includes amplifying the first signal.

25. The method of detecting defined in claim 23, wherein the object is a drill bit.

26. The method of detecting defined in claim 25, wherein the second threshold value is selected such that the presence of material on the drill bit is only detected when the drill bit is substantially clogged.

27. A drilling machine, comprising:
    a spindle for providing a rotational force;
    a drill bit attached to the spindle;
    a worktable positioned under the axis of the drill bit and normal thereto;
    a pressure foot for retaining a board against the worktable;
    a laser mounted inside the pressure foot for directing a beam of light at the drill bit;
    a photodiode for receiving light reflected from the drill bit; and
    means responsive to the photodiode for detecting that the drill bit is clogged.

* * * * *

UNITED STATES PATENT AND TRADEMARK OFFICE
CERTIFICATE OF CORRECTION

PATENT NO. : 5,212,391

DATED : May 18, 1993

INVENTOR(S) : John Wachli

It is certified that error appears in the above-identified patent and that said Letters Patent is hereby corrected as shown below:

Claim 18, Column 14, Line 19, please change "of rotting bit" to --of rotating bit--;

Signed and Sealed this

Twelfth Day of May, 1998

Attest:

BRUCE LEHMAN

Attesting Officer

Commissioner of Patents and Trademarks